(12) United States Patent
Wiedmann et al.

(10) Patent No.: US 7,673,146 B2
(45) Date of Patent: Mar. 2, 2010

(54) METHODS AND SYSTEMS OF REMOTE AUTHENTICATION FOR COMPUTER NETWORKS

(75) Inventors: Ulrich Wiedmann, Redwood City, CA (US); Terrance L. Lillie, Redwood City, CA (US); Richard P. Sneiderman, Sunnyvale, CA (US); Christian Wiedmann, Redwood City, CA (US); Robert Zeljko, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 1174 days.

(21) Appl. No.: 10/861,576

(22) Filed: Jun. 4, 2004

(65) Prior Publication Data

US 2005/0021979 A1    Jan. 27, 2005

Related U.S. Application Data

(66) Substitute for application No. 60/476,364, filed on Jun. 5, 2003.

(51) Int. Cl.
     *H04K 1/00*      (2006.01)
(52) U.S. Cl. .................................................. 713/182
(58) Field of Classification Search ................. 713/162, 713/182; 380/270; 726/15
See application file for complete search history.

(56) References Cited

U.S. PATENT DOCUMENTS

| 7,171,555 B1 * | 1/2007 | Salowey et al. ............. 713/156 |
| 7,174,564 B1 | 2/2007 | Weatherspoon et al. ........ 726/2 |
| 7,325,246 B1 * | 1/2008 | Halasz et al. ................... 726/2 |
| 7,421,266 B1 | 9/2008 | Bruestle et al. ............. 455/411 |
| 2002/0009199 A1 | 1/2002 | Ala-Laurila et al. ......... 380/274 |
| 2002/0076054 A1 | 6/2002 | Fukutomi et al. ........... 380/277 |
| 2002/0178365 A1 | 11/2002 | Yamaguchi .................. 713/182 |
| 2003/0014646 A1 | 1/2003 | Buddhikot et al. .......... 713/184 |
| 2003/0095663 A1 | 5/2003 | Nelson et al. ............... 380/270 |
| 2003/0099362 A1 | 5/2003 | Rollins ....................... 380/278 |
| 2003/0152067 A1 * | 8/2003 | Richmond et al. .......... 370/352 |
| 2003/0200455 A1 | 10/2003 | Wu ............................ 713/200 |
| 2003/0204574 A1 | 10/2003 | Kuperschmidt ............. 709/220 |
| 2003/0219129 A1 | 11/2003 | Whelan et al. .............. 380/270 |
| 2003/0224797 A1 | 12/2003 | Kuan et al. ................. 455/446 |
| 2003/0233580 A1 * | 12/2003 | Keeler et al. ................ 713/201 |

(Continued)

FOREIGN PATENT DOCUMENTS

EP      1081895      3/2001

(Continued)

OTHER PUBLICATIONS

Office Action Summary from U.S. Appl. No. 10/640,434, mailed on Sep. 20, 2007.

(Continued)

*Primary Examiner*—Ellen Tran
(74) *Attorney, Agent, or Firm*—Zilka-Kotab, PC

(57) ABSTRACT

As part of a network node authentication process, a MAC address or other globally unique identifier of an access point through which the network node will access a computer network is transmitted in an EAP or other authentication message to an authentication server to uniquely identify the access point to the authentication server.

21 Claims, 5 Drawing Sheets

U.S. PATENT DOCUMENTS

| | | |
|---|---|---|
| 2004/0003285 A1 | 1/2004 | Whelan et al. ............... 713/201 |
| 2004/0005873 A1 | 1/2004 | Groenendaal et al. ....... 455/410 |
| 2004/0005878 A1 | 1/2004 | Olin et al. ................. 455/414.1 |
| 2004/0023642 A1 | 2/2004 | Tezuka ....................... 455/411 |
| 2004/0049699 A1 | 3/2004 | Griffith et al. ............... 713/201 |
| 2004/0063455 A1 | 4/2004 | Eran et al. .................. 455/525 |
| 2004/0073784 A1 | 4/2004 | Ishidoshiro ................. 713/151 |
| 2004/0076300 A1 | 4/2004 | Ishidoshiro ................. 380/277 |
| 2004/0083362 A1 | 4/2004 | Park et al. ................... 713/162 |
| 2004/0107360 A1* | 6/2004 | Herrmann et al. ........... 713/201 |
| 2004/0198220 A1 | 10/2004 | Whelan et al. .............. 455/41.1 |
| 2004/0203764 A1 | 10/2004 | Hrastar et al. ............ 455/435.1 |
| 2004/0208151 A1* | 10/2004 | Haverinen et al. .......... 370/338 |
| 2005/0073979 A1 | 4/2005 | Barber et al. ............... 370/338 |
| 2005/0083872 A1 | 4/2005 | Kubler et al. ............... 370/328 |
| 2006/0050862 A1 | 3/2006 | Shen et al. .................. 379/219 |

FOREIGN PATENT DOCUMENTS

| | | |
|---|---|---|
| EP | 1178644 | 2/2002 |
| EP | 1408648 | 4/2004 |
| EP | 1411674 | 4/2004 |
| EP | 1081895 | 7/2005 |
| JP | 01111544 | 4/2001 |
| WO | 02/03730 | 1/2002 |
| WO | 03/025597 | 3/2003 |
| WO | WO03/029916 | 4/2003 |
| WO | WO-03029916 | 4/2003 |
| WO | 03/047158 | 6/2003 |
| WO | 03/088547 | 10/2003 |
| WO | 03/096554 | 11/2003 |
| WO | 03/100559 | 12/2003 |

OTHER PUBLICATIONS

Office Action from U.S. Appl. No. 10/640,434 mailed Oct. 28, 2005.
PCT Notification Concerning Transmittal of the International Preliminary Report on Patentability from application No. PCT/US2004/017732 that was mailed on Dec. 22, 2005.
OA from U.S. Appl. No. 10/640,434 mailed Apr. 20, 2007.
OA from U.S. Appl. No. 10/640,434 mailed Apr. 11, 2006.
Aboba, B. et al., "RADIUS Support for Extensible Authentication Protocol (EAP)", *Internet-Draft*, XP015000024, (May 15, 2003), 1-42.
Search Report, "International Searching Authority", PCT/US2004/017732, (Jun. 4, 2004).
Office Action Summary from U.S. Appl. No. 10/640,434 mailed on Jun. 13, 2005.
Office Action Summary from U.S. Appl. No. 10/640,434 mailed on Nov. 2, 2006.
Office Communication from European Application No. 04754356.6-2413 mailed on Apr. 23, 2008.
"Port-Based Network Access Control" http://www.ece.mtu.edu/ee/faculty/mishra/Research/Security/NOTES/802.1x.htm.
Aboba B. et al., "RADIUS Support For Extensible Authentication Protocol (EAP" Internet-Draft, May 15, 2003, XP015000024.
Notice of Allowance from U.S. Appl. No. 10/640,434 mailed on Jun. 27, 2008.
Written opinion from PCT/US2004/017732.
Farrow, R. Wireless Security: Send in the Clowns? www.itarchitect.com/shared/article/showArticle.jhtml?articleId=14400051, Sep. 4, 2003.
Wang et al, "A light weight authentication protocol for axis control in IEEE in 802.11" Iowa State University Department of Electrical and Computer Engineering and Department of Computer Science, Dec. 2003.
Chu, F. "Standards will filled holes in WEP authentication and encryption" eWeek.com, Feb. 3, 2003.
"Wireless repeater—Wireless products—Brief article" www.findarticles.com/p/articles/mi_M0CMN/is_3_40/ai_99114181/print, Mar. 2003.
"Quick Hits: Wireless LAN Security" www.findarticles.com/p/articles/mi_zd4168/is_200306/ai_n9518041/print, Jun. 2003.
Ellison, Craig, "SMC SMC2586W-G" www.findarticles.com/p/articles/mi_zdpcm/is_200403/ai_ziff121528/print, Mar. 2003.
"Versatile access point—Wireless access points and devices—Brief Article"www.findarticles.com/p/articles/mi_m0CMN/is_1_41/ai_112448834/print, Jan. 2004.
Computer Industry, Product Introduction, SMC Corporation, PC Magazine Mar. 12, 2004.
TELC, Telecommunications, Network World Aug. 25, 2003.
Goodwill, Gilbert, Portable Design vol. 9, No. 11, Nov. 1, 2003.
Brewin, Bob, Computerworld vol. 36, No. 45, Nov. 4, 2002.
Strategy: Wireless security with 802.1X, eWeek Feb. 3, 2003.
Snyder, Joel, "Encryption key setting this stem and method, access point, and authentication code setting system" Network World Sep. 9, 2002.
Buddhikot, M., "Efficient authentication and key distribution in wireless IP networks" IEEE Wirel. Commun. vol. 10, No. 6, 2003/ Dec. 2003.
Bakirdan, A., "security algorithms in wireless LAN: proprietary or non-proprietary" Conf Rec IEEE Global Telecommun Conf vol. 3, 2003.
Dornan, Andy, "Wireless security: he is protected accessed enough?" Network Mag. vol. 18, No. 10 2003/Oct. 2003.
Arar, Yardena, "Better 802.11 security", PC World (San Francisco, CA) vol. 21, No. 8 2003/Aug. 2003.
Allen, J. et al., "Securing a wireless network" Proc ACM SIGUCCS Serv Conf 2002.
Arbaugh, W. et al., "Security problems in 802.11-based networks", Commun ACM vol. 46, No. 5 2003/May 2003.
Hayes, Caroline, "How secure is a wireless network?" Electron Prod Des vol. 24, No. 2 2003/Feb. 2003.
Chu, F. "Wireless security improves" IT Week (UK) vol. 6, No. 24, Jun. 23, 2003.
Loutrel, M. et al., "An EAP-BT smartcard for authentication in the next generation of wireless communications" Network control and engineering for QoS, security and mobility. IFIP TC6/WG6.2 and WG6.7 Conference on Network Control and Engineering for QoS, Security and Mobility (Net-Con 2002) 2003.
Yamai, N. et al., "A user authentication system for secure wireless communication" Wireless LANs and Home Networks connecting offices and homes. Proceedings of the international conference on wireless LANs and home networks 2001.

\* cited by examiner

METHODS AND SYSTEMS OF REMOTE AUTHENTICATION FOR COMPUTER NETWORKS

The present application is related to, incorporates by reference and claims the priority benefit of U.S. Provisional Application 60/476,364, entitled "METHODS AND SYSTEMS OF REMOTE AUTHENTICATION FOR COMPUTER NETWORKS", filed Jun. 5, 2003.

FIELD OF THE INVENTION

The present invention relates to schemes for enhancing security within computer networks that include one or more wireless access points through the use of remote, secure authentication mechanisms.

BACKGROUND

Wireless local area networks (WLANs), such as those based on the IEEE 802.11a, 802.11b and 802.11g standards, are becoming ubiquitous in business, government and small office/home office (SOHO) settings because of the freedom afforded by and the decreasing costs of the underlying technology. Current security mechanisms for maintaining the confidentiality, integrity, and availability of wireless communications within such networks are, however, flawed. For example, although the above-cited IEEE standards specify both an authentication service and encryption protocol for wireless networks, methods for compromising these security measures have been well publicized. In response, the community of wireless network equipment developers and vendors has started to adopt the authentication procedures outlined in the 2001 IEEE 802.1x standard entitled "Port Based Network Access Control" in an effort to provide solutions to these security defects. The facilities needed to deploy such access control measures, however, are both expensive and difficult for unsophisticated users to implement.

Before discussing the 802.1x access control mechanisms in detail, it is helpful to review some basics of WLANs in general. Unlike their wired LAN counterparts, WLANs provide for communication among network elements through wireless transmissions (e.g., radio transmissions), as opposed to wired, physical connections. FIG. 1 illustrates an exemplary prior art network 10 including a WLAN. In 802.11-based WLANs, clients or "stations" 12 (i.e., computers with wireless network interface cards (NICs)) interact with other network devices (printers, file servers, other clients, etc.) through access points (APs) 14, which act as bridges between the wired network 16 and wireless network 20. In some cases, wireless clients 12 may communicate directly with one another, without the use of APs.

The 802.1x standard does not itself specify any type of encryption procedures to be used within a network. To date, however, several equipment vendors have offered proprietary versions of dynamic key management for WLANs, using 802.1x as a delivery mechanism. In addition, the Wi-Fi Alliance (a non-profit industry consortium) has included 802.1x in its WPA security standard. Through dynamic key exchanges the authentication server 18 can return individual session keys to an AP 14 as part of the authentication process and these session keys can then be used for encrypted communications between the AP 14 and its clients 12. Dynamic key management provides a more secure environment than is typically found in an 802.11 WLAN because the use of multiple keys that are changed more frequently than is the case for a static key of an ordinary 802.11 network minimizes the opportunity for unauthorized users to uncover the keys.

Unfortunately, implementing an 802.1x solution for a WLAN is not an easy task. For example, the required network infrastructure is complex (potentially involving multiple authentication servers for use in cases of equipment failures) and expensive. In addition, installing the necessary hardware and software in the network and nodes thereof generally cannot be undertaken by unsophisticated users. Consequently, deployment of 802.1x compliant WLANs has not yet become widespread at an enterprise level and is virtually nonexistent at a SOHO level.

SUMMARY OF THE INVENTION

Methods and apparatus for enhancing security within computer networks that include one or more wireless APs are described. In one embodiment, as part of a network node authentication process, access control parameters that define the network node's ability to access other resources (e.g., Internet resources) accessible through a computer network are exchanged by transmitting a MAC address (or other globally unique identifier) of an access point through which the network node will access the computer network in an exchange with a RADIUS or other authentications server (e.g., as part of an EAP message exchange with an authentication server) to identify the access point. In one particular embodiment, the MAC address of the access point is specified in a "Called-Station-ID" RADIUS protocol attribute.

The authentication process may make use of any such process, for example EAP TTLS, EAP TLS or PEAP. Alternatively, or in addition, the authentication process may require the network node and the authentication server (e.g., a RADIUS server) to identify themselves to one another using digital certificates and/or using a password. In other cases, the authentication process may provide for only the network node to be authenticated on the basis of a password. In various embodiments, the authentication process may make use of a secure channel, for example a channel that is both encrypted and integrity-protected, and may include an exchange of encryption keys for use between the access point and the network node.

The access control parameters may be selected from a list of possible rule sets during the authentication process. Such parameters may include rules for handling packets and/or may be associated with routines that allow the access point to monitor any part of a packet header in a packet received from the network node. The access control parameters may be associated with state machines at the access point and/or may be assigned on a per-user-basis. In some cases, the access control parameters are provided to the access point only upon successful verification of the network node's credentials by the authentication server.

The access point may include an access privilege table to which the access control parameters refer. In some embodiments the access point is a wireless network access point and the network node communicates with the access point using a wireless network communication protocol. In these and other embodiments, exchanging access control parameters may include transmitting a MAC address of the network node for authentication by the authentication server.

BRIEF DESCRIPTION OF THE DRAWINGS

A better understanding of the present invention can be obtained from the following detailed description in conjunction with the following drawings, in which.

DETAILED DESCRIPTION

Figure 1:
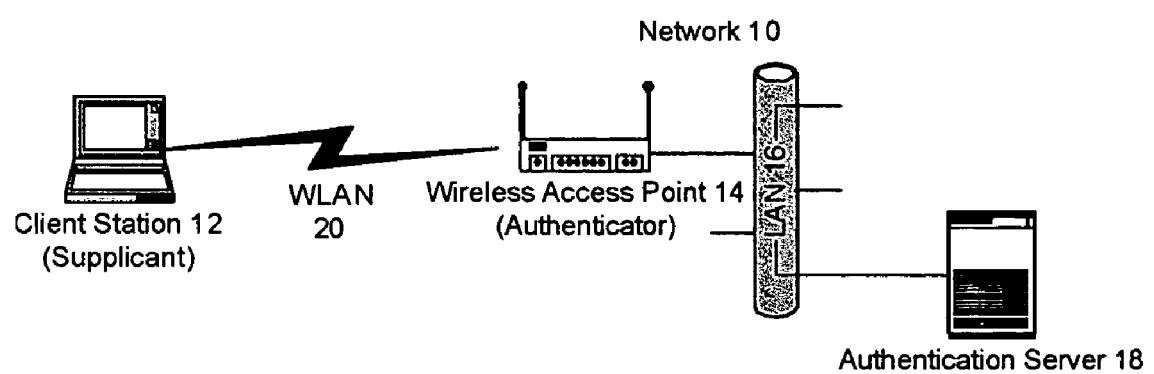
FIG. 1 illustrates an exemplary prior art network including a WLAN.

Described herein are methods and apparatus for enhancing security within computer networks that include one or more wireless APs through the use of remote, secure authentication mechanisms. In some cases, the security enhancements may also be appropriate for wired networks.

In the following discussion, much of the information is described in terms of processes and procedures to be implemented by one or more computer systems executing appropriate algorithms which are embodiments of the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the actions and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices. Moreover, as used herein, the term table can refer to any data structure.

As mentioned above, security in IEEE 802.11 networks is provided by an authentication service and an optional encryption protocol. The encryption protocol is known as WEP (wired equivalent privacy) and is a link-layer security protocol based on the RC4 stream cipher, a symmetric cipher where the same key is used for both encryption and decryption. WEP was intended to provide confidentiality for wireless communications, through the use of encryption; access control for a network, through the option to discard improperly encrypted packets; and data integrity, through the use of a checksum. Unfortunately, however, WEP has been shown to have fundamental flaws (including flaws that allow hackers to uncover the actual cipher keys) which can be exploited to allow unauthorized clients to gain access to an 802.11 WLAN.

Likewise, the authentication process used in 802.11 WLANs is insecure. A client must authenticate and establish an association with an AP 14 prior to transmitting data. An association is simply a binding between the client 12 and an AP 14. The 802.11 standards provide for two types of authentication: open systems authentication and shared-key authentication.

Open systems authentication is usually the default mode of operation and allows any client 12 to associate with an AP 14 as long as the network identifiers (termed "SSID" or service set identification) used by the client 12 and the AP 14 match. Consequently, anyone who knows the SSID of a network can configure a client to be authenticated by an AP 14 on that network. Thus, because such SSIDs are broadcast by APs 14 in the clear as part of their beacon transmissions; open system authentication provides no security whatsoever.

Shared-key authentication is a one-way authentication mechanism used to provide more stringent access to network resources. The term "one-way" authentication is used because although the AP 14 must authenticate the client, there is no provision for a client to authenticate an AP 14. In a shared-key network a client 12 seeking to associate with an AP 14 must successfully encrypt a challenge string issued by the AP 14 before being authenticated. However, because it is the WEP key (and not a different authentication key) that is used in this process, shared-key authentication is really no more secure than WEP itself Consequently, because WEP keys can be uncovered simply by monitoring transmissions within a WLAN, shared-key authentication networks are also vulnerable to attack.

Recognizing these flaws in 802.11 WLANs, some AP equipment vendors have added an additional security layer in the form of an access control list based on client MAC addresses. In such cases, the AP 14 allows only those clients with authorized MAC addresses to create an association. However, such MAC-address filters are somewhat time consuming to establish and maintain and, consequently, are not often used.

Given the weakness of current 802.11 security mechanisms, some equipment vendors and network operators have begun to implement WLAN access control based on the relatively new EEE 802.1x standard. The 802.1x standard provides mechanisms for client authentication, network access control, and cryptographic key management within any network (i.e., whether it is a wired or wireless LAN). These mechanisms are based upon an existing authentication protocol known as the Extensible Authentication Protocol (EAP), which is specified in various Internet Engineering Task Force (IETF) Requests For Comments (RFCs). In 802.1x parlance, clients 12 seek access to a network through an authenticator (usually an AP 14 in the case of a WLAN), which refers such requests to an authentication server 18. In practice, the authentication server 18 is usually a Remote Authentication Dial-In User Service (RADIUS) server, although RADIUS is not specifically required by the 802.1x standard. Only if the authentication server verifies the client's 12 identity will the AP 14 allow the client 12 to access other network resources.

What is needed therefore are mechanisms to allow for more widespread deployment of this technology to provide enhanced security for new and existing WLANs. As indicated above, the 802.1x specification provides a procedure for network client authentication. In the context of wireless networks, such authentication is performed via an AP 14 and an authentication server 18, usually a RADIUS server.

Figure 2:
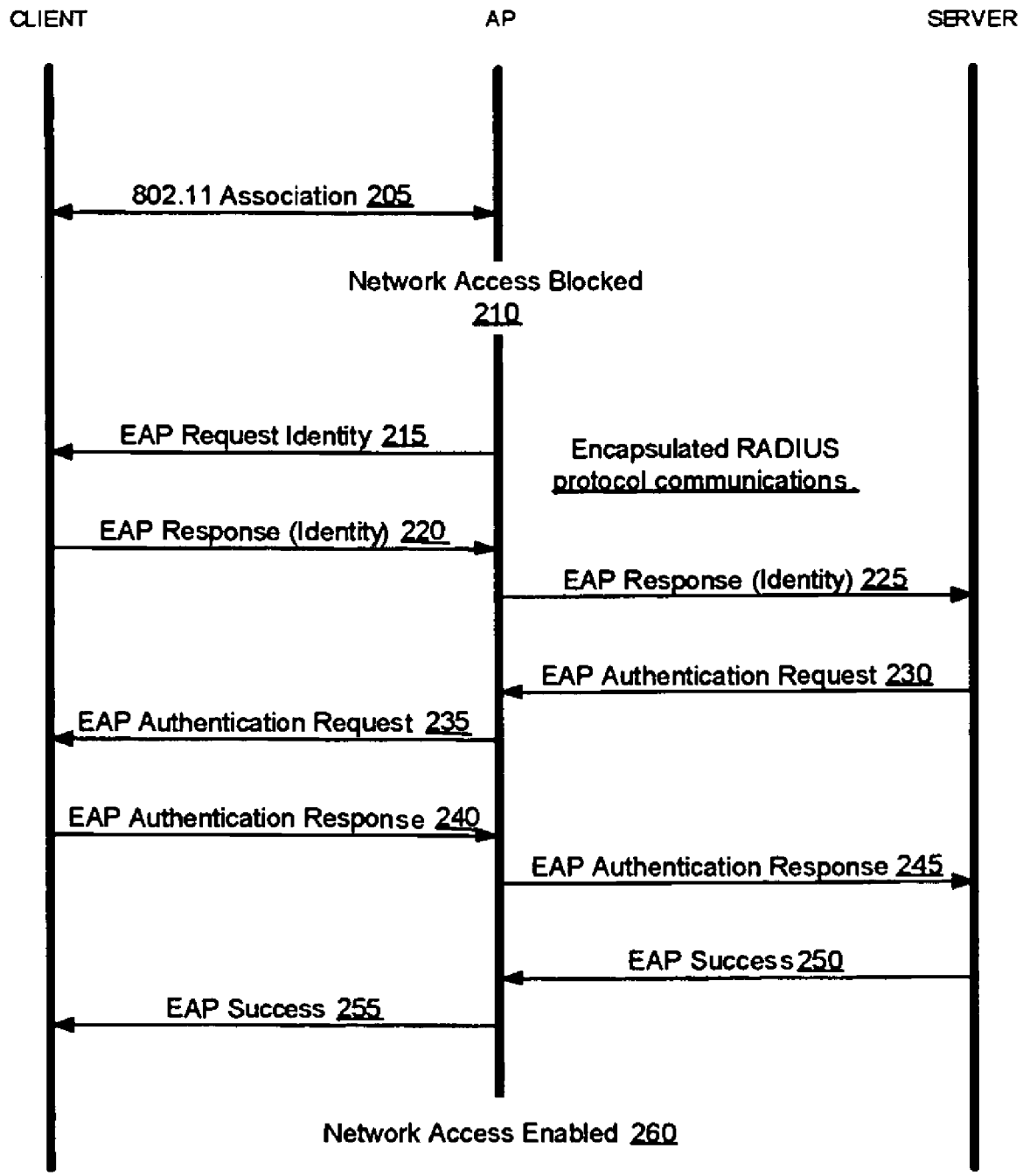
FIG. 2 illustrates the basic authentication process in a typical network, according to one embodiment.

FIG. 2 illustrates the basic authentication process 200 in a typical network, according to one embodiment. As the diagram illustrates, the client 12 (called the supplicant in 802.1x terminology) first establishes an association with the AP 14 (the authenticator) using the conventional 802.11 procedures (205). At this point, however, the AP 14 prevents the client 12 from further accessing network resources until the client is authenticated (210). The authentication process begins with the AP 14 transmitting an EAP request for the client's identity (credentials) (215) and the client 12 providing a response (220). These messages are encapsulated within wireless LAN frames in a process referred to as EAP over LAN.

Thereafter, the EAP information provided by the client 12 is passed by the AP 14 to an authentication server (e.g., a RADIUS server) 18 over the wired LAN 16 (225). This time, the EAP information is encapsulated within a packet that conforms to the RADIUS protocol (a process known as EAP over RADIUS). The authentication server 18 then begins a dialog with the AP 14. The exact details of this exchange vary depending upon which authentication process is used in the network 10, but of importance to the present discussion is the need for the authentication server 18 to properly identify the AP 14 (230). The EAP authentication request is sent to the client 12 (235). The client 12 provides an EAP authentication response (240) to the AP 14. The AP 14 passes the authentication response to the authentication server 18 (245). Unless the AP 14 is properly identified, the authentication server 18 cannot process the authentication request. Assuming the AP 14 is properly identified (250), the authentication server 18 provides the information necessary to verify the client's identity (and in some cases, vice versa) (255), and the client 12 is granted access to the network via AP 14 (260).

Various authentication procedures which might be used in such an authentication scheme include EAP-TLS (transport level security), in which both the client and the authentication server identify themselves to one another using digital certificates; EAP-TTLS (tunneled TLS), in which the client and authentication server identify themselves to one another but only the server has a digital certificate; EAP-SRP (secure remote password), in which both devices are authenticated using a password; EAP-MSD5, in which only the client is authenticated by the server on the basis of a password; and protected EAP (PEAP), which uses a secure channel. In the EAP-TLS, EAP-TTLS and EAP-SRP processes, encryption keys for use between the AP 14 and the client 12 are generated as part of the exchange. In PEAP, a secure channel that is both encrypted and integrity-protected with TLS is created and then a new EAP negotiation with another EAP type occurs, authenticating the network access attempt of the client. Because the TLS channel protects EAP negotiation and authentication for the network access attempt, password-based authentication protocols that are normally susceptible to an offline dictionary attack can be used for authentication.

Regardless of the authentication method used, however, conventional authentication techniques employing RADIUS servers require that the AP 14 be identified using its Internet Protocol (IP) addresses. This IP address is used for a variety of reasons, most importantly to look up the shared secret that is used to protect communications between the AP 14 and the authentication server 18. Thus, the procedure cannot be used where AP IP addresses are subject to change, for example as would occur when the authentication server 18 is connected to private network 10 through a device which performs network address translation. An example of a situation in which an AP might have an IP address that is subject to change involves connecting the LAN 16 to the authentication server 18 via the Internet.

A RADIUS server generally is not connected to the private LAN directly since it may not be economically feasible for a network operator to do so. As mentioned above, deploying such a network is a costly and technically complex proposition. Therefore, it is an aspect of the present invention to provide a remote authentication mechanism for private LAN owners/operators that may be utilized on a fee for service or other basis. In this model, LAN owners/operators are spared the cost of purchasing, installing and maintaining expensive server resources and instead may lease the authentication services from a third party provider.

Figure 3:
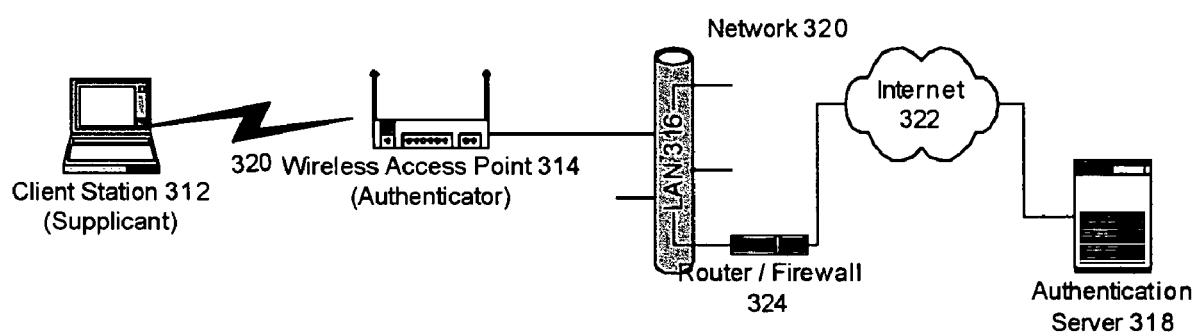
FIG. 3 illustrates an exemplary network having a wireless local area network configured for remote authentication, according to one embodiment of the present invention.

FIG. 3 illustrates an exemplary network 320 having a wireless local area network configured for remote authentication, according to one embodiment of the present invention. According to this embodiment, the private LAN 316 is connected to the Internet 322 via a router 324. Router 324 may include a firewall application, or the firewall may be executing on a separate machine. The firewall acts as a filter that prevents unauthorized users from gaining access to private LAN 316 and its resources.

Connected between LAN 316 and the Internet 322, router 324 directs network traffic (i.e., packets) according to its programmed routing tables. As part of this process, router 324 usually performs network address translation (NAT), without which the multiple nodes of LAN 316 could not share the single address on the Internet 322. NAT of course involves the substitution of a LAN node's true IP address for a "masquerade" address provided by router 324, thus the IP address of AP 314 is hidden to outside resources (such as authentication server 318) and cannot serve as an effective identifier outside of LAN 316.

Other network configurations may involve APs 314 being assigned IP addresses dynamically. That is, a particular AP 314 may not identify itself using the same IP address each time it tries to provide a connection to a private network. This would represent another instance in which the use of an IP address to identify an AP 314 to the authentication server (whether remote or local to LAN 316) would be unsatisfactory.

In order to allow for these types of network configurations (i.e., the use of a remote authentication server 318 and/or networks in which APs 314 may be assigned different IP addresses from time to time), the present method and system involves utilizing an AP identifier other than an IP address in connection with the authentication process. Any AP parameter that remains unchanged may be used, however, in one embodiment, an AP's MAC (media access controller) address, rather than its IP address is used in connection with such authentication. The MAC address is a parameter that is not affected by NAT when an AP 314 establishes a connection to the authentication server 318 via router 324. In other embodiments, other unique AP identifiers that could be passed unchanged from the AP 314 to the authentication server 318 as part of the authentication process may be used.

In order for the AP's MAC address to be passed from the AP 314 to the authentication server 318, the MAC address will need to be included in the EAP over RADIUS messages passed between these devices. The RADIUS protocol provides one or more existing fields within which such information may be provided. For example, the RADIUS protocol specifies a "Called-Station-ID" attribute, which was originally intended to identify the telephone number that a client was calling in order to establish a connection to a network. RADIUS was originally intended to support authentication of dial-up users, hence the need for such information. In the present context, however, this parameter is unnecessary and so the AP 314 could be modified to insert its MAC address in place of such a telephone number. Alternatively, other attributes of the RADIUS protocol that are otherwise unused in the authentication exchange between AP 314 and server 318 could be used for this purpose.

Figure 4:
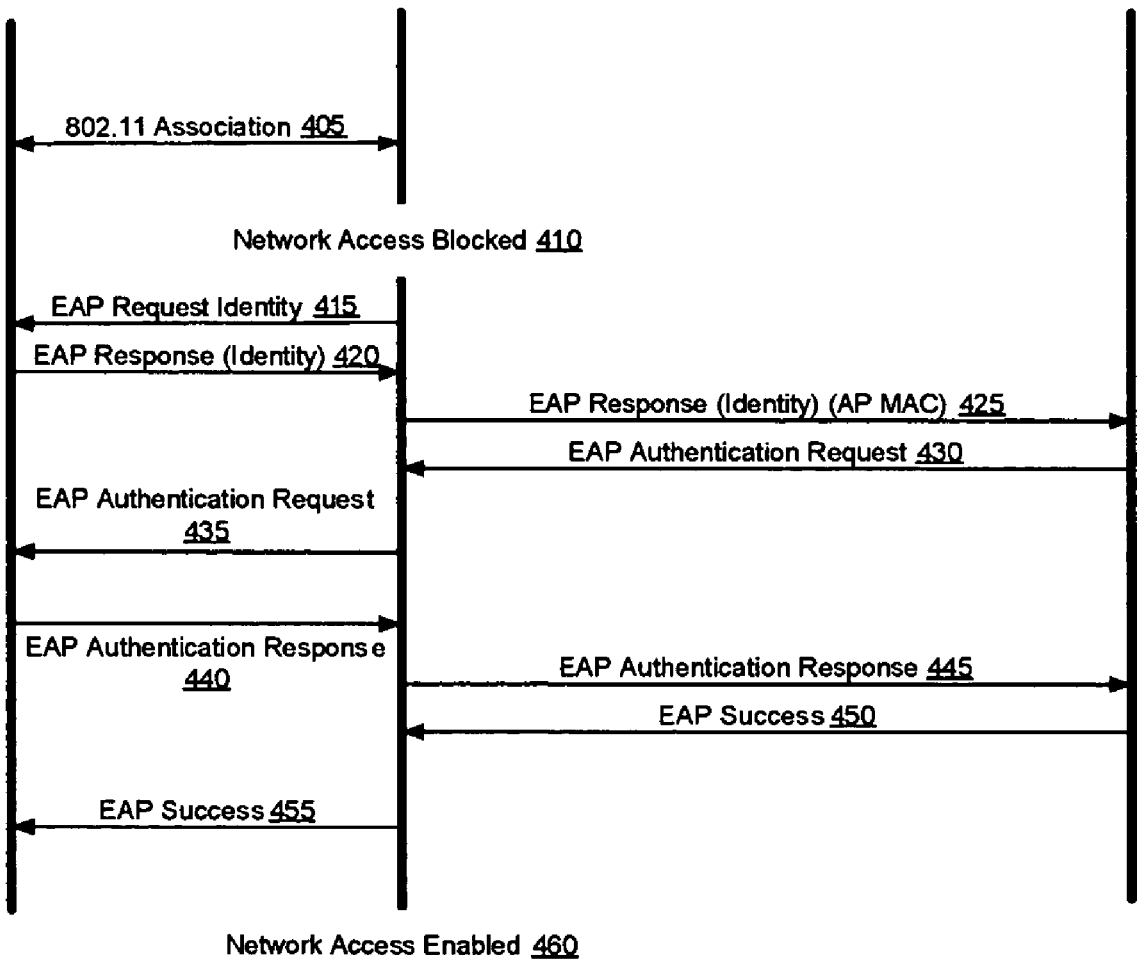
FIG. 4 illustrates an authentication process in a network, according to one embodiment of the present invention.

FIG. 4 illustrates an authentication process 400 in a network 320, according to one embodiment of the present invention. As the diagram illustrates, the client 312 first establishes an association with the AP 314 (the authenticator) using the conventional 802.11 procedures (405). At this point, however, the AP 314 prevents the client 312 from further accessing network resources until the client is authenticated (410). The authentication process begins with the AP 314 transmitting an EAP request for the client's identity (credentials) (415) and the client 312 providing a response (420). These messages are encapsulated within wireless LAN frames in a process referred to as EAP over LAN.

Thereafter, the EAP information provided by the client 312 is passed by the AP 314 to an authentication server (e.g., a RADIUS server) 318 over the wired LAN 316 (425). This time, the EAP information is encapsulated within a packet that conforms to the RADIUS protocol (a process known as EAP over RADIUS). The authentication server 318 then begins a dialog with the AP 314. The authentication server 318 is configured to initiate its authentication procedures using the AP's MAC address rather than the "masquerade" IP address provided by router 324. Once the AP 314 is identified on the basis of its MAC address (or other unique identifying parameter), the authentication server 318 may determine which LAN 316 is involved (e.g., via a table lookup to associate the AP MAC address with a particular LAN) and identify which authentication process to use for the client 312 that is now requesting access to that LAN. The authentication server 318 properly identifies the AP 314 (430) via its MAC address. The EAP authentication request is sent to the client 312 (435). The client 312 provides an EAP authentication response (440) to the AP 314. The AP 314 passes the authentication response to the authentication server 318 (445). Unless the AP 314 is properly identified, the authentication server 318 cannot process the authentication request. Assuming the AP 314 is properly identified (450), the authentication server 318 provides the information necessary to verify the client's identity (and in some cases, vice versa) (455), and the client 312 is granted access to the network via AP 314 (460).

In another embodiment, a software application executing on the client 312 may be configured to add the client's 312 and the AP's 314 MAC addresses to the username to be used for authentication. This way, the AP 314 does not need to be modified to add this information to a RADIUS field. Such a mechanism is useful for Aps 314 that support 802.1x but which do not pass MAC addresses for the AP 314 or the client 312 as part of the authentication message exchange.

Once the AP 314 is identified on the basis of its MAC address (or other unique identifying parameter), the authentication server 318 may determine which LAN 316 is involved (e.g., via a table lookup to associate the AP MAC address with a particular LAN) and identify which authentication process to use for the client 312 that is now requesting access to that LAN. That is, different networks can employ different authentication procedures (e.g., EAP-TLS, EAP-TTLS, etc.) and through the table lookup or other association process the authentication server 318 can determine which procedure to employ for each network. If the client 312 is successfully identified according to its network's authentication procedure, the AP 314 is instructed to allow the client access to LAN 316.

As part of the authentication process, the authentication server 318 may provide session or dynamic keys for use between the AP 314 and a client 312. The use of dynamic keys (rather than a static WEP key for an entire network) helps to further enhance the security of the WLAN. Because such keys are typically used for a much briefer time than is the case for a static WEP key, it is less likely than an unauthorized person can uncover the key and hijack the network. In fact, because such keys are unknown to the actual users of network 320 (i.e., the keys are only known by the AP 314 and the client 312) the most pervasive form of hacking a network, social engineering, is completely unavailable to potential hijackers.

Figure 5:
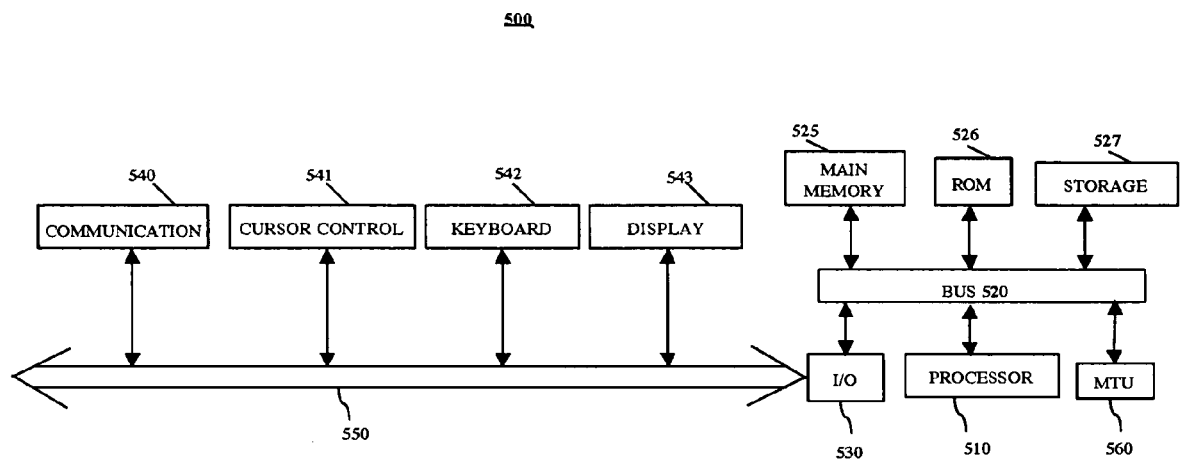
FIG. 5 illustrates an exemplary computer architecture, according to one embodiment of the present invention.

Having briefly described an exemplary network architecture 320 which employs various elements of the present invention, a computer system 500 representing exemplary clients 312, and/or servers (e.g., servers 318), in which elements of the present invention may be implemented will now be described with reference to FIG. 5.

One embodiment of computer system 500 comprises a system bus 520 for communicating information, and a processor 510 coupled to bus 520 for processing information. Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and/or other static storage device 526 coupled to bus 520 for storing static information and instructions used by processor 510.

A data storage device 527 such as a magnetic disk or optical disc and its corresponding drive may also be coupled to computer system 500 for storing information and instructions. Computer system 500 can also be coupled to a second I/O bus 550 via an I/O interface 530. Multiple I/O devices may be coupled to I/O bus 550, including a display device 543, an input device (e.g., an alphanumeric input device 542 and/or a cursor control device 541). For example, Internet information may be presented to the user on the display device 543.

The communication device 540 is for accessing other computers (servers or clients) via a network 316, 322. The communication device 540 may comprise a modem, a network interface card, or other well-known interface device, such as those used for coupling to Ethernet, token ring, or other types of networks.

Thus, methods and apparatus for enhancing security within computer networks that include one or more wireless APs have been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method, comprising exchanging, as part of a network node authentication process, access control parameters that define a network node's ability to access other resources accessible through a computer network, wherein exchanging the access control parameters includes transmitting a MAC address of an access point through which the network node will access the computer network in an authentication message to an authentication server to uniquely identify the access point to the authentication server;

wherein the access control parameters are selected from a list of possible rule sets during the network node authentication process;

wherein the access control parameters are provided to the access point only upon successful verification of the network node's credentials by the authentication server;

wherein exchanging the access control parameters further includes transmitting a MAC address of the network node for authentication by the authentication server;

wherein the network node authentication process includes the network node and the authentication server identifying themselves to one another using digital certificates;

wherein the network node authentication process requires the network node and the authentication server to be authenticated using a password;

wherein the access control parameters are assigned on a per-user basis;

wherein the access control parameters comprise rules for handling packets;

wherein a software application executing on the network node is configured to add the network node's and the access point's MAC addresses to a username to be used for authentication by the authentication server.

2. The method of claim 1, wherein the authentication message comprises an EAP message.

3. The method of claim 1, wherein the network node authentication process makes use of an EAP TTLS authentication process.

4. The method of claim 1 wherein the network node authentication process makes use of an EAP TLS authentication process.

5. The method of claim 1 wherein the network node authentication process makes use of a PEAP authentication process.

6. The method of claim 1 wherein the network node authentication process provides for only the network node to be authenticated on the basis of the password.

7. The method of claim 1 wherein the network node authentication process uses a secure channel.

8. The method of claim 7 wherein the secure channel is both encrypted and integrity-protected.

9. The method of claim 1 wherein the network node authentication process includes an exchange of encryption keys for use between the access point and the network node.

10. The method of claim 1 wherein the authentication server comprises a RADIUS server.

11. The method of claim 1 wherein the access control parameters are associated with routines that allow the access point to monitor any part of a packet header in a packet received from the network node.

12. The method of claim 1 wherein the access control parameters are associated with state machines at the access point.

13. The method of claim 1 wherein the access point includes an access privilege table to which the access control parameters refer.

14. The method of claim 1 wherein the resources include Internet access.

15. The method of claim 1 wherein the access point comprises a wireless network access point and the network node communicates with the access point using a wireless network communication protocol.

16. The method of claim 1, wherein the MAC address of the access point is specified in a "Called-Station-ID" RADIUS protocol attribute.

17. The method of claim 1, wherein the authentication server provides dynamic encryption keys for use between the access point and the network node.

18. The method of claim 1, wherein the network node authentication process makes use of an EAP MSD5 authentication process.

19. The method of claim 1, wherein the network node authentication process makes use of an EAP SRP authentication process.

20. The method of claim 1, wherein the authentication server determines a local area network to which the network node has requested access utilizing a table lookup associating the MAC address of the access point with the local area network, and further identifies the network node authentication process from a plurality of network node authentication processes for use in authenticating the network node.

21. A method, comprising exchanging, as part of a network node authentication process, a unique identifier other than an Internet protocol address of an access point through which a network node will access a computer network in an authentication message to an authentication server to uniquely identify the access point to the authentication server;

wherein access control parameters are selected from a list of possible rule sets during the network node authentication process;

wherein the access control parameters are provided to the access point only upon successful verification of the network nod's credentials by the authentication server;

wherein a MAC address of the network node is transmitted for authentication by the authentication server;

wherein the network node authentication process includes the network node and the authentication server identifying themselves to one another using digital certificates;

wherein the network node authentication process requires the network node and the authentication server to be authenticated using a password;

wherein the access control parameters are assigned on a per-user basis;

wherein the access control parameters comprise rules for handling packets;

wherein a software application executing on the network node is configured to add the network node's and the access point's MAC addresses to a username to be used for authentication by the authentication server.

* * * * *